(No Model.) 2 Sheets—Sheet 1.
J. J. JETER.
HORSE DETACHER.
No. 404,090. Patented May 28, 1889.
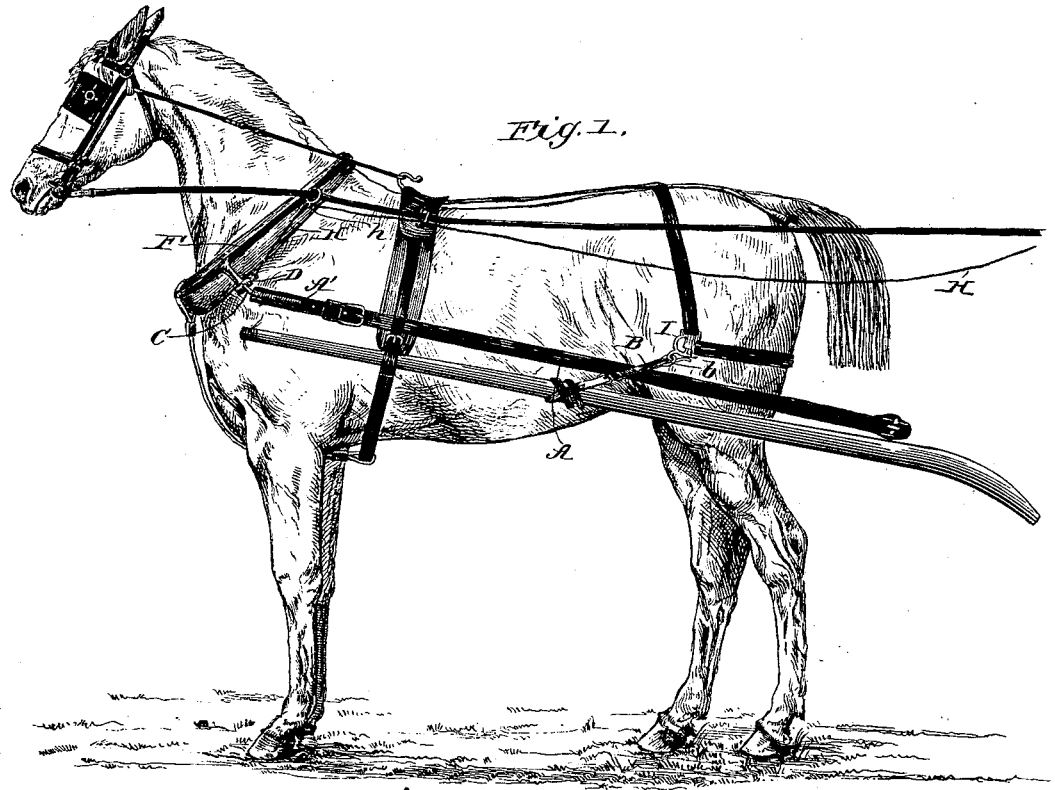
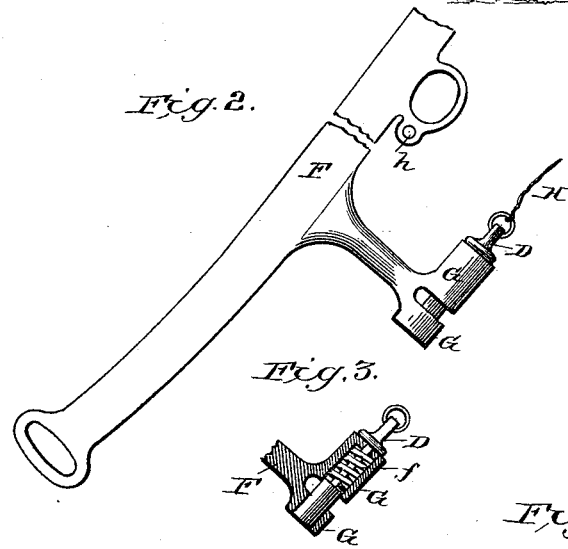
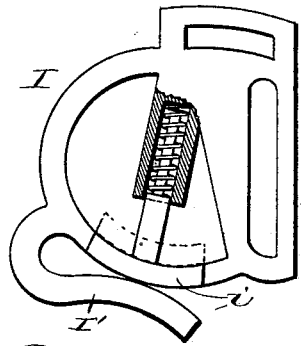
WITNESSES:
Fred G. Dieterich
P. B. Turpin
INVENTOR:
John J. Jeter
BY
Munn & Co
ATTORNEYS.

(No Model.) 2 Sheets—Sheet 2.

J. J. JETER.
HORSE DETACHER.

No. 404,090. Patented May 28, 1889.

WITNESSES:
Fred G. Dieterich
P. B. Turpin

INVENTOR:
John J. Jeter
BY Mann & Co.
ATTORNEYS.

UNITED STATES PATENT OFFICE.

JOHN J. JETER, OF CAMPBELLSVILLE, KENTUCKY.

HORSE-DETACHER.

SPECIFICATION forming part of Letters Patent No. 404,090, dated May 28, 1889.

Application filed December 27, 1888. Serial No. 294,795. (No model.)

*To all whom it may concern:*

Be it known that I, JOHN J. JETER, of Campbellsville, in the county of Taylor and State of Kentucky, have invented a new and useful Improvement in Horse-Detachers, of which the following is a specification.

My invention is an improved horse-detacher which seeks to provide novel constructions and combinations of parts whereby at the will of the driver the traces secured at their rear ends to the vehicle may be detached at their forward ends from the hames or breast-strap, and the backing-strap, also secured to the vehicle, may, as the horse moves forward, be detached from the breeching.

The invention consists in certain novel constructions and combinations of parts, as will be hereinafter described, and pointed out in the claims.

Figure 6:
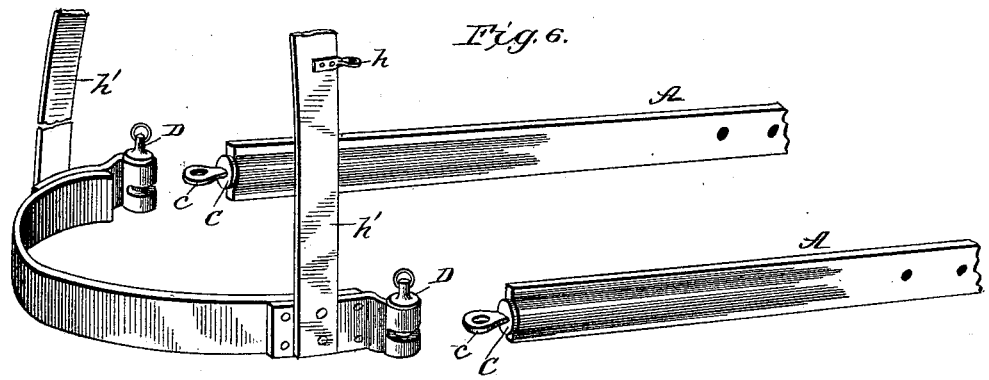
Figure 7:
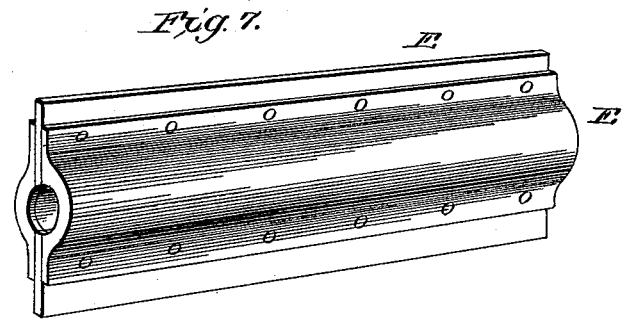
Figure 9:
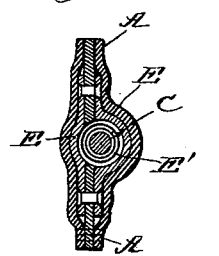
Figure 8:
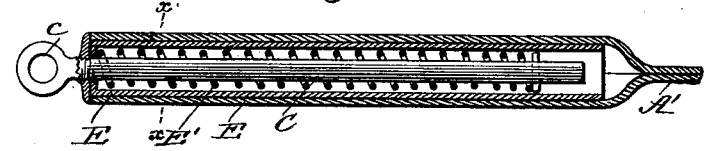
Figure 10:
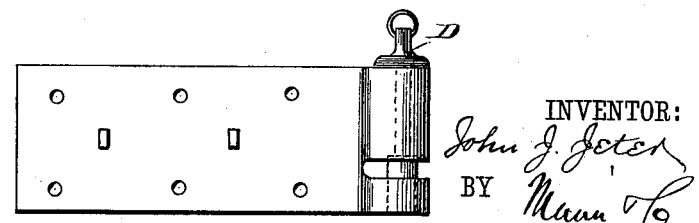

In the drawings, Figure 1 is a side view of a horse showing my improvements as in use. Fig. 2 is a detail view of one of the hames partly broken away. Fig. 3 is a detail sectional view showing the keeper and latch-pin in detail. Fig. 4 is a detail view, part in section, of the ring-clip. Fig. 5 is a detail view of the metallic trace-tongue. Fig. 6 illustrates the manner of using the invention with a breast-strap or breast-collar. Fig. 7 is a detail view of the metal sheath for the trace-tongue. Fig. 8 is a horizontal longitudinal section of the forward end of the trace. Fig. 9 is a cross-section on about line $x\ x$, Fig. 8, and Fig. 10 shows one of the metal bars used with the breast-strap.

In carrying out my invention I connect the traces A at their forward ends detachably with the hames or with the breast strap or collar, and also the backing-strap B detachably with the breeching. Where the improvement is used with collar and hames, it is preferred to connect the traces with the hames, and I will first describe such construction. The traces proper preferably connect at the forward ends with the tugs A', which latter preferably have the metallic tongue C, provided at their forward ends with eyes $c$ to receive the latch-pin D. The tongue C operates in a metallic case, E, sheathed in the leather of the tug, and the spring E' engages the tongue in such manner as to resist the longitudinal movement of such tongue, and so ease the jar and strain on both horse and vehicle when the horse is started up quickly. The tug may be buckled to the trace proper in any suitable manner.

The hame F is provided with the latch-pin D, which operates through perforated lugs or eyes G, which form a keeper for the latch-pin and are separated sufficiently to receive the eye $c$ between them, and the pin D is normally pressed down through the lower lug, G, by the spring $f$, so that when such pin D is drawn upward and the eye $c$ placed between lugs G and the pin D released, the said pin will enter eye $c$ and secure the trace to the hame until such time as the pin may be drawn upward out of the said eye $c$. To operate said pin D, a cord, H, is attached at one end thereto, extends upward therefrom through an eye or guide-opening, $h$, just under the driving-line, and extends thence back through the eye on the saddle and may be attached at its rear end to the driving-lines in convenient reach of the driver.

It will be understood that there are two of these cords H, one at each side of the horse, and that they should be sufficiently slack to prevent the ordinary handling of the lines from releasing the latch-pins. By drawing on these cords H the latch-pins may be moved upward to release the traces, as will be readily understood. When a breast-strap or breast-collar is used, I support the keeper G for the latch-pin on said strap or collar, forming such parts in metallic bars riveted or otherwise suitably secured in the breast-strap, as will be understood from Fig. 6 of the drawings. In such case the guide $h$ may be supported on the strap $h'$ above the keeper G, as shown in said figure.

The breast-strap may to a certain extent be regarded as an equivalent of the hames and be included in the appended claims in the reference to the hames or their equivalents, as it will be understood that I do not desire to be limited in the broad features of my invention to the arrangement of the latch-pin and the keeper therefor on the hame; but I desire to cover such parts when applied to any part of the harness to which it is desired to connect the forward end of the traces, which part of the harness may, for convenience of reference, be termed the "harness-draft bearing," as it receives the bearing or pressure of the horse in exerting the draft, and such term may be fairly said to include the collar and hames, the breast strap or collar, and any similar constructions for the same purpose.

In operation the latch-pin is withdrawn and the horse may move forward out of the shafts; to release the backing-straps B, I provide the ring-clips I, which are connected with the breeching at the lower front corners thereof, and support a ring, $b$, at the end of the backing-strap.

The ring-clip is formed with a hook, I', which opens rearwardly, and is provided with a detent, $i$, spring-actuated in such manner as to close the mouth or opening of the hook, such detent being adapted to prevent the ring $b$ from jarring out of the hook when fitted therein, as shown in Fig. 1. It will be seen, however, that the detent will permit the ring $b$ to be forced into the hook from the front or be drawn out of such hook as the horse moves forward after the traces have been released, the said construction forming a detachable connection between the backing-strap and the breeching.

It will be seen that the construction is simple, renders the hitching and unhitching of the horse easy and expeditious, and the construction in ordinary use is secure and safe, while in case of runaway or other emergency, in which the quick detachment of the horse may be desired, the animal may at once be detached from the vehicle, saving the latter and its occupants from the threatened danger.

Having thus described my invention, what I claim as new is—

1. The improved horse-detacher, substantially as described, comprising the traces and detachable connections between such traces, the harness-draft bearing, the holdback or backing-strap connected at one end with the vehicle-shafts and provided at their opposite ends with rings $b$, and the ring-clips I, secured to the breeching, having hooks I', opening rearwardly and arranged for engagement by rings $b$, and provided with detents by which to hold the said rings from jarring out of the ring-clips, all substantially as and for the purposes set forth.

2. In a horse-detacher substantially as described, the hames F, constructed with keepers G, the latch-pins D, operating in said keepers, the spring for actuating such latch-pins, guides $h$, constructed on the hames above the latch-pins, and the cords H, connected with the latch-pins and extended up through the guides $h$, all substantially as and for the purposes specified.

3. The improved horse-detacher herein described, consisting of the collar provided with keepers for the trace-eyes and with latch-pins operating therein, and provided above such latch-pins with guides $h$ for cords H, the traces having eyes held in said keepers, the cords H, connected with the latch-pins and extended through guides $h$, the holdback or backing-strap secured to the thills and provided with the rings $b$, the breeching, and the ring-clips I, secured to such breeching and constructed with the hooks I' for engagement by the rings $b$, and with spring-actuated detents $i$, all constructed, arranged, and adapted for use substantially as and for the purposes set forth.

JOHN J. JETER.

Witnesses:
J. W. BASS,
A. T. CAMPBELL.